(12) United States Patent
Kaplan et al.

(10) Patent No.: US 8,295,819 B1
(45) Date of Patent: Oct. 23, 2012

(54) PICTURE CALLER ID SYSTEMS, METHODS AND APPARATUS

(75) Inventors: Diego Kaplan, San Diego, CA (US); Jun Han, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1204 days.

(21) Appl. No.: 11/313,116

(22) Filed: Dec. 19, 2005

(51) Int. Cl.
*H04M 3/42* (2006.01)
*H04M 1/64* (2006.01)
*H04M 1/56* (2006.01)

(52) U.S. Cl. .................. 455/415; 379/88.19; 379/88.21; 379/412.06

(58) Field of Classification Search .................. 455/415; 379/142.01–142.06
See application file for complete search history.

(56) References Cited

U.S. PATENT DOCUMENTS

| | | | | |
|---|---|---|---|---|
| 5,907,604 | A | * | 5/1999 | Hsu ........................... 379/142.06 |
| 7,046,994 | B1 | * | 5/2006 | Padawer et al. ............... 455/415 |
| 2003/0012353 | A1 | | 1/2003 | Tang et al. |
| 2004/0121818 | A1 | | 6/2004 | Paakkonen |
| 2004/0192268 | A1 | * | 9/2004 | Pyhalammi ................. 455/414.1 |
| 2006/0052091 | A1 | * | 3/2006 | Onyon et al. .................. 455/415 |

OTHER PUBLICATIONS

Internet Document: "PocketX Software—News and Press Releases" at http://www.pocketx.net/news/pr_main.html (Feb. 11, 2005).
Internet Document: "LG 1400" at www.cingularcompany.com/lg1400.htm (Feb. 11, 2005).
Internet Document: "SCP—6400" at http://www.sanyo.com/wireless/handsets/downloads/PCS-6400_SINGLE.pdf#search='sanyo%20scp6400%20lineup' (Feb. 11, 2005).
Internet Document: "Photo contacts—Personalizing your Smartphone mobile experience with Photo Caller ID . . . " at http://www.pocketx.net/smartphone/photocontacts.html (Feb. 11, 2005).

* cited by examiner

*Primary Examiner* — Wayne Cai
*Assistant Examiner* — Huy C Ho

(57) ABSTRACT

A communication system is provided that enables automated retrieval of caller ID picture information and association with contact information, while still allowing security control over information or images that are sent to the requesting device. The communication system has a wireless device communicating with a picture server. The wireless device receives an incoming call with caller ID information, and determines if a picture is locally stored for the caller. If no picture is locally stored for the caller, then a request is made to retrieve a picture from the picture server. If the picture server has the requested picture, and the wireless device is authorized to receive the picture, then the picture is downloaded to the wireless device, where the picture is associated with contact information for the caller. The picture of the caller will then be automatically displayed when the caller places future calls.

8 Claims, 7 Drawing Sheets

PICTURE CALLER ID SYSTEMS, METHODS AND APPARATUS

FIELD OF THE INVENTION

The present invention relates generally to the field of telecommunications, and more specifically to methods, systems and devices for providing picture enhanced caller identification services.

BACKGROUND OF THE INVENTION

Recently, telecommunications devices have evolved rapidly from bulky, simple, wired rotary dial telephones to intelligent wireless "smart phones" complete with powerful CPU's and Color LCD displays. These intelligent wireless communications devices take many forms, and frequently include additional features such as still or video cameras. Many of these devices also come equipped with memory and even expansion slots for the addition of portable memory and file transfer capability. Telecommunication services have also evolved rapidly from simple telephone calls and fax communications to a plethora of advanced user services. Voice mail, call waiting, call blocking, call forwarding and call return are just a few examples of the advanced user services offered to telephone customers.

To keep up with the demand for ever more sophisticated user services and the ever more powerful and capable new generation wired or wireless communication devices, telecommunications networks have also evolved from simple switching networks like the Public Switching Telephone Network (PSTN) to "Intelligent Networks" and even "Advanced Intelligent Networks" offering services far more advanced than simple voice calling. These new intelligent networks enable service providers to offer advanced services due to larger more powerful computing devices managing the networks. These intelligent networks also allow network architecture that enables network accessibility to third party vendor partners offering niche services desired by the consumer, but not necessarily palatable to the carrier, through high speed fiber or wireless connections. Examples of types of network and network protocols include but are not limited to: UTMS, PCS, CDMA, WCDMA, CDMA2000, GSM, PCS, EDGE, and GPRS.

Caller Identification (or caller ID) is a well-known example of a service that has gained ubiquitous use with telephone customers. Caller ID is a telephone on-hook capability that provides a called party with information about a calling party before the call is answered. Conventionally, such information includes the date and time of the call and the caller's telephone number. Additionally, a caller's name may also be provided to the called party subscriber in what is known as an "enhanced caller ID" service. The information is typically displayed on a display unit connected to or built into the telephone. Current caller ID technologies include mobile telephone applications where called parties may designate a particular identifier for a particular phone number, or even more than one identifier for a particular phone number. Mobile phone and caller ID technologies have advanced such that identifiers may now include ring tones and graphical displays.

While there exists the ability to add images to a phone for association with a particular phone number, the images are not necessarily representative of the person placing the call. To match a caller ID with a picture of the caller, a user must first take a picture of the caller, upload the picture of the caller to the communication device to be used, via a computing device if the communication device is not equipped with a camera, and then specifically and manually assign the image to the locally stored contact data in the communication device. Should the user have more than one communication device, and the particular contact exist in each of the devices locally stored contact data, this arduous process must be repeated for each device.

Despite the advances in telecommunications network technologies, services, and telecommunication devices, a need still exists for enhanced devices and networks that enable automated retrieval of picture and/or contact information, while still allowing users the ability to control what types of information or images are sent to a requesting device.

SUMMARY OF THE INVENTION

Briefly, the present invention has a communication system that enables automated retrieval of caller ID picture information and association with contact information, while still allowing security control over information or images that are sent to the requesting device. The communication system has a wireless device communicating with a picture server. The wireless device receives an incoming call with caller ID information, and determines if a picture is locally stored for the caller. If no picture is locally stored for the caller, then a request is made to retrieve a picture from the picture server. If the picture server has the requested picture, and the wireless device is authorized to receive the picture, then the picture is downloaded to the wireless device, where the picture is associated with contact information for the caller. The picture of the caller will then be automatically displayed when the caller places future calls.

The described system and method allow for automated distribution and retrieval of picture enhanced caller ID contact information, and includes processes for allowing the owner of the contact information to configure how the contact information is to be shared. Therefore the present invention provides an improved caller ID service that allows a called party to view a previously acquired picture of a caller before answering an incoming call. This improved caller ID service is applicable to a mobile communication system over a mobile communication network as well as a wired communication system.

In one example, the present invention provides a wireless communication device configured to allow local storage of caller ID contact information and images (picture caller ID). The wireless device also has access to a picture server to retrieve picture caller ID contact information and images, and may use an SMS or MMS communication process. The wireless device also uses a processor, which operates the steps for automated retrieval of caller ID contact information and images. A picture server is also provided that is configured to allow for storage and management of picture caller contact information and images, as well as the automated and controlled retrieval of picture caller ID contact information and images.

The present invention further relates to machine readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structures containing embodiments of the present invention.

BRIEF DESCRIPTION OF THE DRAWINGS

The present invention is described herein with reference to the following drawings. The drawings are provided for purposes of illustration only and not limitation. It should be noted that for clarity and ease of illustration, these drawings are not made to scale and that in some instances various aspects of the invention may be shown exaggerated or enlarged to facilitate an understanding of the invention.

DETAILED DESCRIPTION

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

Figure 1:
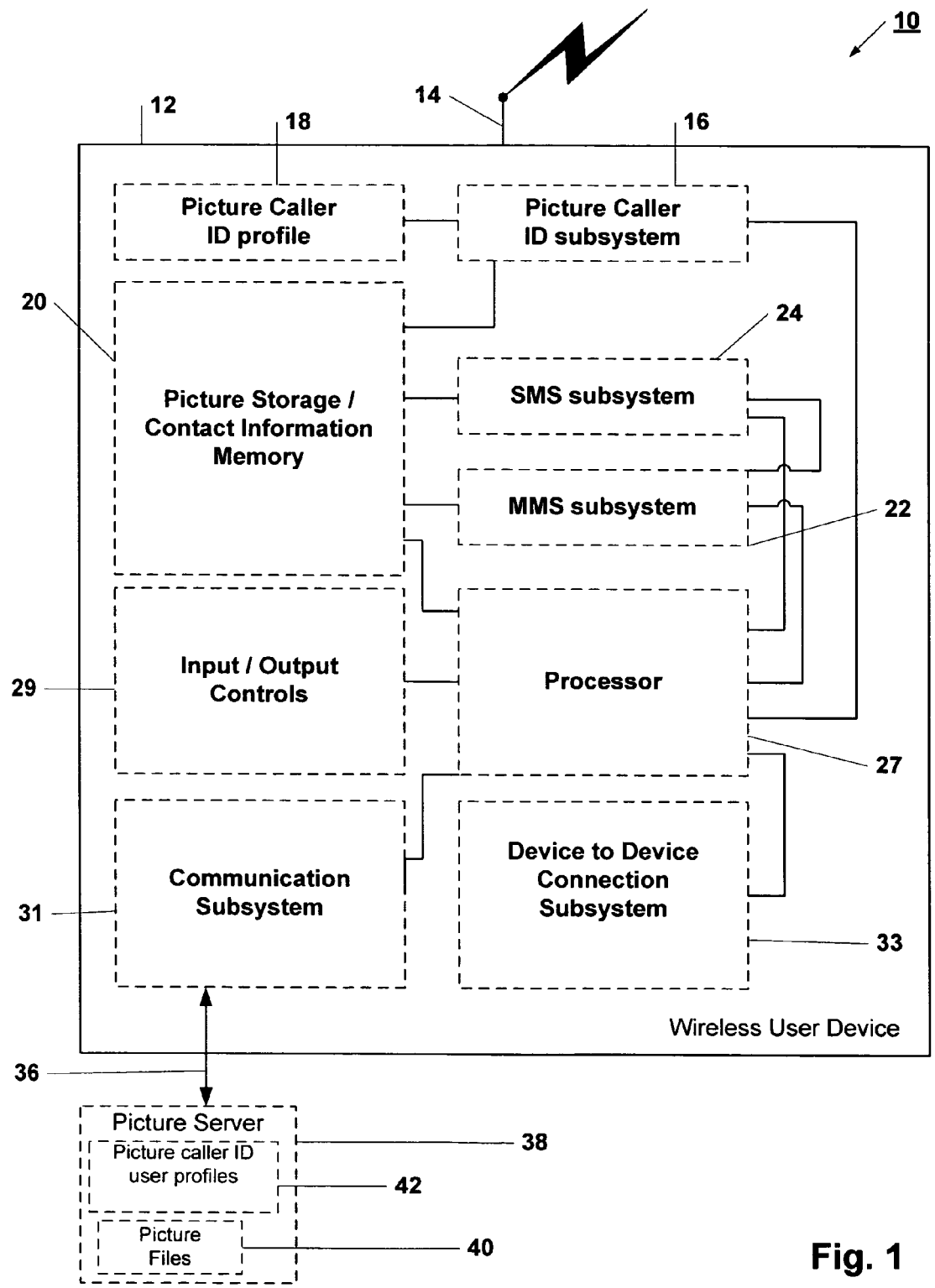
FIG. 1 is a block diagram of a wireless communication device in accordance with the present invention.

Referring now to FIG. 1, wireless device 10 is illustrated. Wireless device 10 is enabled for automated picture caller ID contact information retrieval. It will be understood that wireless communications devices may be configured to operate on a variety of service provider networks, and that network architecture and communications protocols are constantly evolving and emerging as technology becomes available and user requirements change. Therefore it will be understood that the description provided herein for the wireless user device encompasses devices configurable to operate on any telecommunications network. Wireless device 10 has enclosure 12 which has antenna 14, picture caller ID subsystem 16, picture caller ID profile 18, memory 20, MMS (Multimedia Message System) subsystem, SMS (Short Message System) subsystem 24, processor 27, input and output controllers 29, communication subsystem 31, and device to device connection subsystem 33. Also shown in FIG. 1, external to enclosure 12, are network contact 36, picture server 38, and picture files 40 stored within picture server 38. The manufacture of wireless communications devices is well known and will not be discussed in detail herein.

Picture caller ID subsystem 16 enables automated picture caller ID contact information location and retrieval. Picture caller ID subsystem 16 is a combination of hardware and software controlled by processor 27 and operates the steps of:

1) accessing caller ID contact information in a local memory;
2) detecting locally stored contact information that is associated with caller ID information in an incoming call;
3) determining if there is image data associated with the locally stored contact data for the incoming call;
4) requesting picture and contact information 40 from picture and contact information server 38 if image data is not locally available;
5) receiving image data status communication from picture and contact information server 38;
6) downloading image data for the contact according to predefined download rules; and
7) storing locally the image date in local picture storage 20.

System 10 may also be used to control how pictures and contact information is distributed within the system. In this way, a user may set security and distribution rules on his or her own picture and contact information. To set use restrictions, picture caller ID profile 18 operates in conjunction with picture caller ID subsystem 16 and processor 27. Picture caller ID profile 18 contains contact information and rules governing uploading and downloading of picture caller ID contact information. For example, a user may configure a user profile associated with the caller ID information linked to his or her telephone number. The user may allow requestors to access all or just portions of his or her contact information. The caller ID contact information may be stored locally in the user's wireless device 10 or stored remotely in picture server 38. In either location, all or portions of the caller ID contact information maybe made available for transport according to rules stored in the picture caller ID profile 18 or 42 stored in either wireless device 10 or picture server 38, respectively. It will be appreciated that caller ID information is assigned to a network subscriber telephone number and includes at least the telephone number assigned to the user, and in many cases the users name. It will also be appreciated that some networks offer enhanced caller ID services. The present invention makes use of all types of caller ID contact information from all levels of caller ID service. The sharing of the additional or enhanced caller ID contact information can be also be governed by rules configured in the picture caller ID contact information files 40 or by rules stored locally in picture caller ID profile 18.

Memory 20 stores wireless device's 10 operating system, phone book, ring tones, images, any software necessary for the function of built in input or output controllers, and the like. In particular memory 20 in wireless device 10 is sufficient for the storage of contact information in the range of about 10 contacts to about 999 contacts, in addition to the memory necessary for wireless device 10 operations. The use of memory units in wireless telecommunications devices is well known and will not be discussed in detail herein.

MMS subsystem 22 acting in conjunction with processor 27 and enables transport of the picture caller ID contact information upon upload or download request. MMS (Multimedia Messaging Service), is a technology that enables creating, sending, and receiving text messages that also include images, audio, or video clip. An MMS message is a multimedia presentation in a single entry. MMS is advantageously used in the present invention because the message format allows the inclusion of text, images and audio as part of the message, and additionally it easier to create and simpler to deliver than an email with attachments. The use of MMS is also advantageous because MMS is a scalable technology, which means it's suitable for most types of wireless communication devices. MMS messages can be sent from one wireless device to another, or to an email address. In the present invention, the requested enhanced or picture caller ID contact information is formatted as an MMS message for transport to or from the picture server 38, or directly between wireless devices 10. It will be appreciated that MMS may be provided on various communication platforms. It will also be appreciated that certain extensions and improvements are in use or contemplated for the MMS systems, including providing servers optimized for audio and video. Also, the length and complexity of messages may be adjusted according to technical capability of mobile devices and network infrastructure. It will also be understood that messaging standards evolve and adapt as technology and user requirements change. The construction and operation of Multimedia Messaging Systems, MMS network services, and mobile devices enabled for MMS is well known and will not be discussed in detail herein.

SMS subsystem 24 acting in conjunction with processor 27 enables receipt of picture availability status communication from picture server 38 when a request for picture caller ID contact information file 40 is sent from wireless device 10 to picture server 38. Typically, SMS messages are textual and limited in length, for example to 160 alphanumeric characters. Such short messages are desirably used for simple communications, such as receiving stock market quotes, abbreviated e-mail, bank account balances, short commercial transactions, traffic conditions, and in the case of the present invention contact information availability from a picture server 38. Picture server 38 transmits SMS format message to wireless device 10 containing availability of the requested picture caller ID contact information file 40. Local device 10 authorizes download to wireless device 10 by means of a return SMS message to picture server 38, through SMS subsystem 24. It will be appreciated that SMS may be provided on various communication platforms. It will also be appreciated that certain extensions are in use or contemplated for the SMS systems. For example, SMS may extend to allow audio, image, or video data to also be transmitted and received. Also, the length and complexity of messages may be adjusted according to technical capability of mobile devices and network infrastructure. It will also be understood that messaging standards evolve and adapt as technology and user requirements change.

Processor 27 performs the operations required for normal wireless device 10 function. These operations include, but are not limited to, executing; wireless telecommunication device operating system software; executing personal digital assistant type functions; message center functions, internet browsing functions, camera functions, communication system functions, video display functions and the like. Additionally, processor 27 performs the operations required for the present invention. More particularly, processor 27 performs the operations of:
 1) receiving an incoming caller ID message;
 2) associating the caller ID message with a locally stored contact;
 3) determining if a picture is locally stored for the contact;
 4) requesting a remotely stored picture of the contact responsive to determining that no local picture is stored; and
 5) receiving the remotely stored picture of the contact.

It will be appreciated that computing device, chip design, and processor design are continuously evolving and improving. It will also be appreciated that as technology and user requirements change processors of increasing complexity and power are easily substituted for processors currently in use. Therefore it will be understood that the present invention includes processor designs and technologies not currently available. The construction and operation of computing or device processors in wireless telecommunications devices is well known and will not be discussed in detail herein.

Input/Output controls 29 are any device that can be used to input information into or interact with the wireless device, or any device that can be used to emit, view, receive, or display information and include but are not limited to video display, keypad, touch sensitive screen, LCD display, pointer device, camera, video camera, speakers, and expansion ports.

Communication subsystem 31 comprises all components of the wireless telecommunication device necessary for wireless device to network contact or wireless device-to-device contact, including, but not limited to, call sending and receiving, MMS and SMS message sending and receiving, and World Wide Web access. It will be understood that communication subsystem 31 will have different hardware, firmware and software needs depending on the operation being performed.

Device to device connection subsystem 33 comprises those components necessary to establish non-network based direct connection between the wireless telecommunications device and any other device. Examples of devices using this device to device wireless connection include but are not limited to wireless headsets, PDA's, biometric devices and the like. In some instances, device-to-device connection subsystem 33 can also be used to obtain picture caller ID contact information directly from another telecommunication device enabled for device-to-device connection. Typically these types of connections are made using short-range radio frequency (RF) transmission, electromagnetic (EM) transmission or cable connection means. These short range RF or EM transmission technologies and cable or wire based device to device connection methods include, but are not limited to Bluetooth, Infrared, Wi-Fi, Firewire, USB, or any of the 802.11a-g frequencies. It will also be appreciated that new short to medium range transmission means and methods suitable for device to device connection, as well as cable or wire based means of device to device connections are continuously being developed, while currently existing means are being improved. Therefore it will be understood that the present invention allows for improvements in technologies by substitution of new or improved versions of various device-to-device connection methods and means.

Network connection 36 is the connection established between wireless device 10 and the device user's subscribed network. In the case of wireless device 10 this network contact is established wirelessly through radio frequency or radio channel between communication subsystem 31, antenna 14 and the subscriber's network. While system 10 is illustrated for wireless devices operating through mobile or cellular networks, other wired or landline networks are contemplated, such as the Public Switched Telephone Network (PSTN) or any network that transmits or uses caller ID information. It will also be appreciated that wireless communications devices may be configured to operate on a multitude of service provider networks, and that network architecture and communications protocols are constantly evolving and emerging as technology becomes available and user requirements change. Therefore it will be understood that the description provided herein which contains network contact 36 encompasses any of the many types telecommunications network platforms and protocols be they mobile or landline based. Examples of types of networks and network protocols include but are not limited to, UTMS, PCS, CDMA, WCDMA, CDMA2000, GSM, PCN, EDGE, and GPRS.

Figure 2:
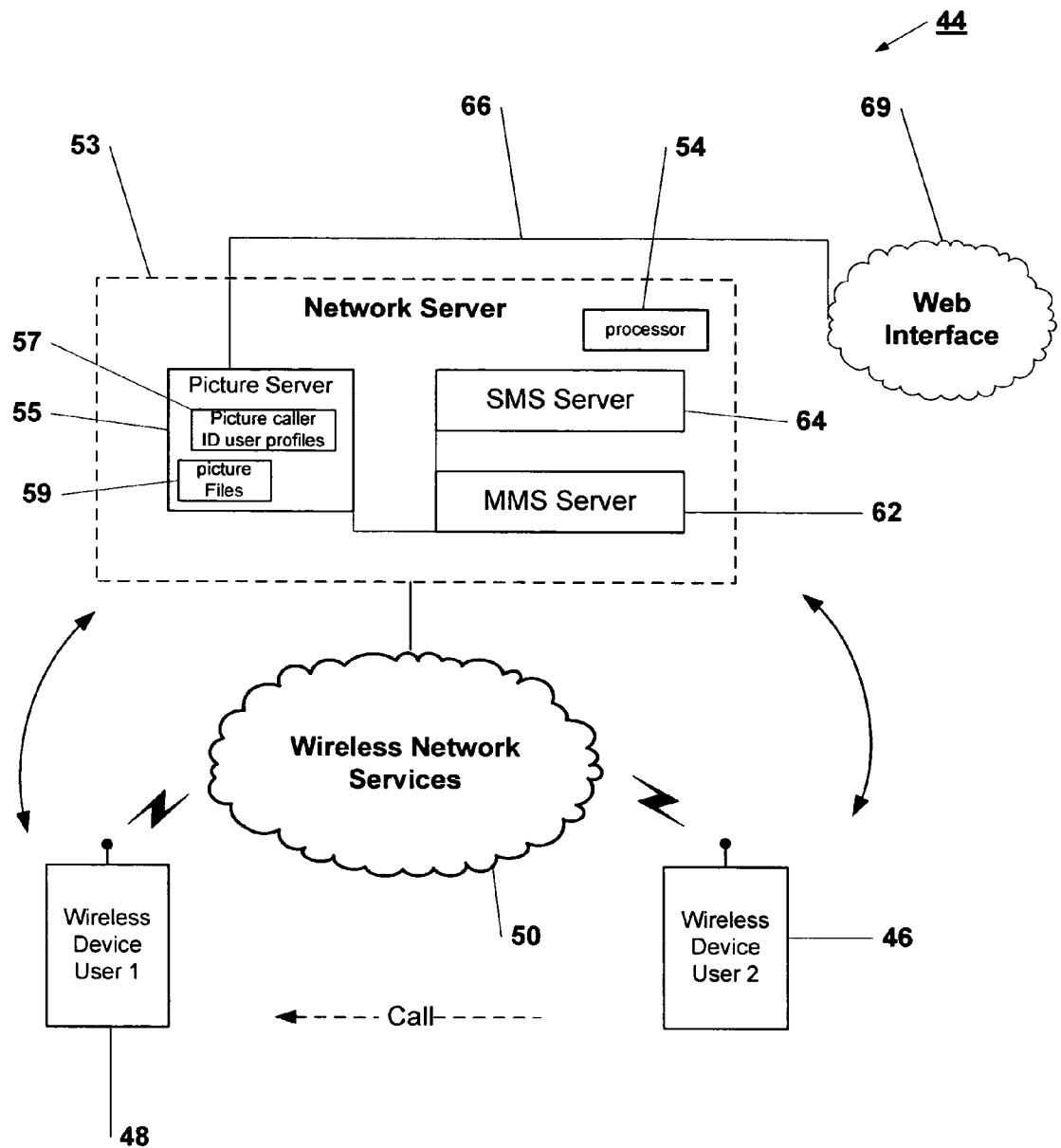
FIG. 2 is a block diagram of a communication system enabled for providing picture caller ID information in accordance with the present invention.
Figure 3:
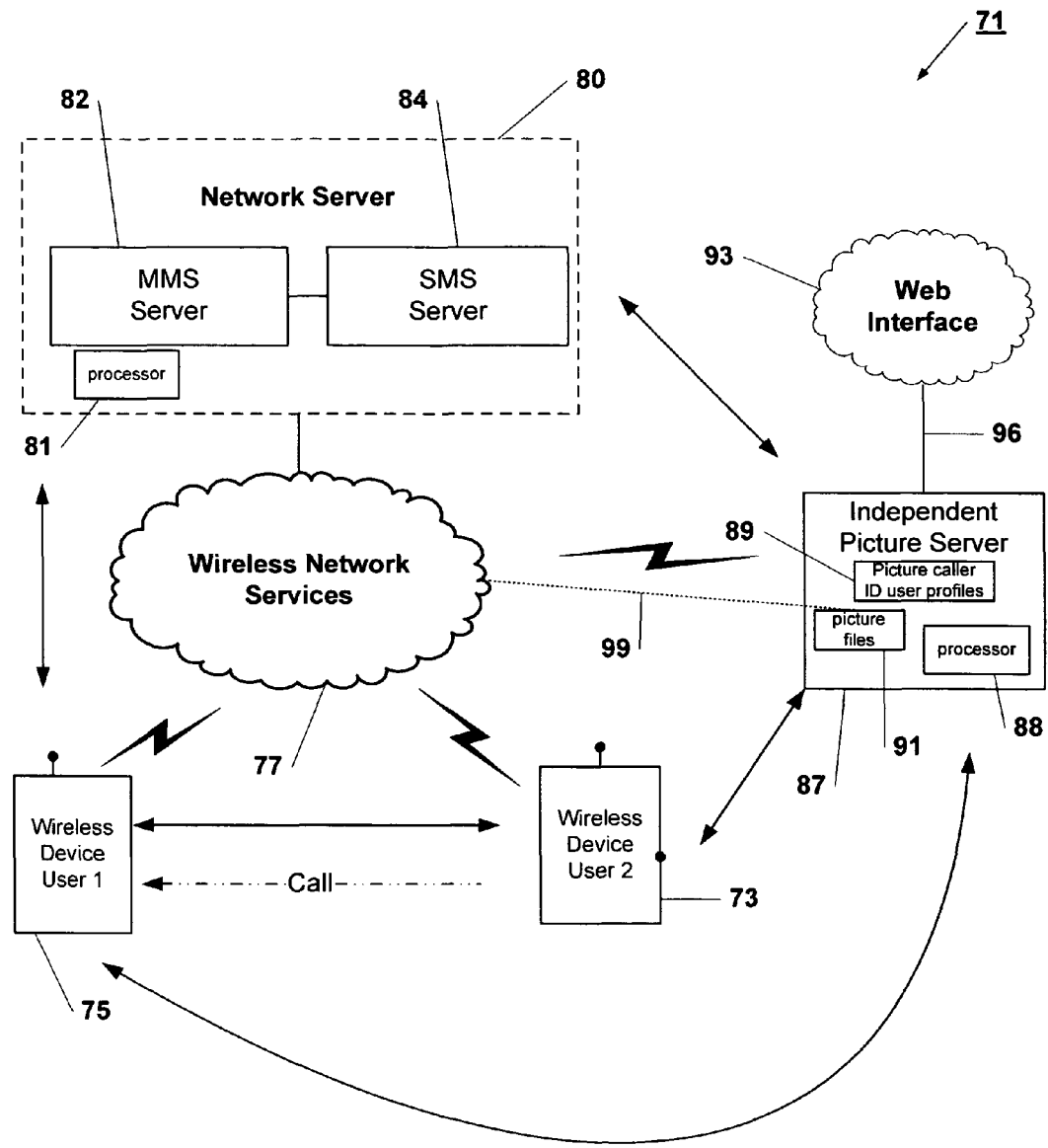
FIG. 3 is a block diagram of a communication system enabled for providing picture caller ID information in accordance with the present invention.

Picture server 38, existing apart from wireless communication device 10, comprises a computing or processing device performing the operations for maintaining and operating a remote picture caller ID database, and is configured to respond to requests for picture caller ID information transport (upload or download). The picture server may also be used in configuring and using picture caller ID profiles 42 stored in picture server 38, and for storing contact information. Picture server 38 will be described in greater detail below. It will be appreciated that picture server 38 may exist within the telecommunications network architecture, or as an independent entity, maintained by a third party provider of picture caller ID information services, which can be accessed either by a network contact 36 or through a Internet based interface as illustrated in FIGS. 2 and 3.

Picture files 40 encompass caller ID information as well as image files attached to the caller ID contact information, creating an enhanced picture caller ID contact information file. Picture files 40 may also include or be associated with user-configured rules or profiles 38, which act to set rules, restrictions, or other controls on the distribution of an image or associated contact information. It will be appreciated that these rules may or may not also be stored in picture caller ID profile 18 contained in wireless communication device 10.

In an example, wireless device 10 receives an incoming call carried on network connection 36, acting through antenna 14, to communication subsystem 31. Caller ID information is extracted from the incoming call, and a call alert is generated for the local user. The caller ID information, interpreted by processor 27, then displays the incoming caller ID contact information through input/output controller system 29, and on the wireless device screen. Processor 27, acting in conjunction with memory 20, associates caller id message with locally stored contact information. Processor 27 determines if a picture is locally stored for the contact. It will also be appreciated that there are numerous steps involved in the determination process. Some of these steps include, but are not limited to, simultaneous or prior association of the caller ID message with locally stored contact information; simultaneous or prior determination of whether caller ID message matches previously stored contact information; identification of image or image marker associated with image that identifies the presence of an already existing image associated with caller ID message (memory 20 and picture caller ID subsystem 16); accessing memory 20 and picture caller ID subsystem 16 to display image if present on input/output control 29, wireless device screen, and the like. If processor 27 determines there is no locally stored image for the incoming caller ID message contact information, processor 27 may then display such information on input/output control 29, wireless device screen, as well as initiate processor subroutine for automated picture caller ID image retrieval, either in call or upon call termination. In another example, wireless device 10 may request image or more complete contact information upon a user inputting at least partial contact information in local storage 20.

Processor 27, upon finding no locally stored image file associated with locally stored caller ID contact information, requests a remotely stored picture file 40 from picture server 38, typically by sending an SMS message. It will be appreciated that initiation of the process for automated picture retrieval can be controlled by rules configured in picture caller ID profile 18. It will also be understood that the level of automation of the process can be either complete (i.e., no dialog with user) or partial (i.e., some level of dialog required to initiate download). It will also be appreciated that that picture server 38 may exist within the telecommunications network architecture, or as an independent third party provider's picture server maybe accessed either by telecommunications network or web based interface. In response to its picture request, wireless device 10 may receive an SMS message from picture server 38 regarding availability of requested picture file 40, and download authorization. Wireless device 10 may locally present picture availability status and request further user authorization, or may automatically authorize an immediate download by sending a responsive SMS message to picture server 38. It will be appreciated that there are numerous steps involved in integrating the functions of all the systems and subsystems.

Wireless device 10 receives the requested picture, which is typically transmitted as an MMS message from picture server 38. The MMS picture file will be transported either over network contact 36 or through a separate contact with a network either in call or upon call termination. It will be appreciated that due to the nature of the data included in picture caller ID contact information files 40, that the MMS message format which allows the inclusion of text, images, and audio, is well suited as the message format for picture caller ID contact file 40 transport. It will also be appreciated that while the picture caller ID file 40, message format is described with reference to the MMS message standard, it will be understood that other message standards may be used. For example, an EMS system (Enhanced Message Service) or SMS (Short Messaging Service) that has been enhanced to allow the use of voice or images may also be used. It will also be understood that messaging standards evolve and adapt as technology and user requirements change. If the picture was acquired in call, processor 27 associates the newly acquired picture file 40 with the contact information in picture caller ID subsystem 16 and displays image on input/output control 29, wireless device screen, while in call. If the picture was acquired after call termination processor 27 associates picture file 40 with contact information stored in memory 20 associated with picture caller ID subsystem 16 so that image is ready for display upon the next received caller ID message from the particular caller.

Referring now to FIG. 2, a system for providing picture caller ID services is illustrated. More particularly, network system 44 provides for automated picture caller ID file 59 transport to appropriately enabled wireless devices 46 and 48. Wireless devices 46 and 48 are enabled for automated picture caller ID contact information retrieval as described in detail with reference to FIG. 1. Network server 53, which forms a part of wireless network services 50 processing and computing infrastructure, contains a processor 54, SMS server 64, MMS server 62, and picture server 55. It will be appreciated that as network server 53 forms part of wireless network services 50 processing and computing infrastructure, network server 53 also contains the processors and computing devices necessary to provide normal network functionality. It will be understood that in addition to the normal network functionality provided by wireless network services 50 and the processors contained within network server 53, network server 53 also contains a processor 54 performing the operations of;

1) receiving a request for a picture associated with caller id contact information;
2) associating the requested caller id with locally stored contact;
3) determining if a picture is locally stored for the contact;
4) communicating picture data status;
5) receiving a request for picture download responsive to picture data status communication; and
6) transporting requested picture data to requesting device.

It will also be appreciated that picture server 55 may exist either as part of the wireless network services 50 infrastructure as provided by network server 53, or as illustrated in FIG. 3, picture server 87 can exist independently of (i.e., outside) the network services infrastructure. It will be further appreciated that the MMS and SMS servers, 62 and 64 respectively, may be part of the infrastructure equipment, or may be coupled to the services via a network connection (not illustrated).

Referring again to FIG. 2, picture server 55 contains images and contact information stored as picture caller ID contact files 59. Picture server 55 also contains picture caller ID user profiles 57. It will be understood that the present invention encompasses all available caller ID message information, including information carried as enhanced caller ID services. The present invention also encompasses any information entered in creation of picture caller ID contact file 59. Picture caller ID user profile 57 may contain rules used to control the automated distribution of information and images used in locally stored device picture caller ID contact files. Users may configure their picture caller ID user profiles 57 using web interface 69, which accesses the user's picture caller ID user profile configuration stored on picture server 55. The web connection may be over network contact 66, or through an internet connection to the picture server. Alternatively, users may configure their caller ID profiles using wireless device 46 or 48, which can connect to the picture server profile 55 through wireless network services 50 interface.

As illustrated in FIG. 3, picture caller ID user profile 89 contains rules used to control the automated distribution of information and images to wireless devices. Users can configure their picture caller ID user profiles 89 in a number of ways. One way to configure picture caller ID profile 89 is by a web interface 93 accessing picture caller ID user profile's 89 configuration menu stored on picture server 87 over network contact 96, which may be an internet connection to the picture server. Another way to configure picture caller ID profile 89 is by wireless device 73 or 75 connected to wireless network services 77 interface for picture caller ID user profile's 89 configuration menu located in picture server 87. It will be appreciated that picture server 87 maybe located independently of host network infrastructure wireless network services 77, and network server 80. It will be appreciated that picture caller ID user profiles 89 and the configuration menu for picture caller ID user profiles 89, as well as picture caller ID contact files 91 can also be accessed from wireless device 73 or 75 by connection to wireless network services infrastructure 77 followed by connection to independent picture server 87 either by a wireless or wired contact 99. It will be appreciated that independent picture server 87 maybe configured to allow wireless access from telecommunication networks, landline, or Internet access.

Referring again to FIG. 2, user 2, using wireless device 46, places a call to user 1 at wireless device 48. Wireless network services 50 and network server 53 provide all necessary functions to allow normal call routing to receiving subscriber device requested by the phone number dialed. Wireless device receives the incoming call, and if the call contains caller ID information, extracts the caller ID information and compares it to locally stored contract information. If wireless device 48 (user 1) determines that the incoming caller ID message is either not associated with locally stored contact information or that locally stored contact information has no picture associated with it, wireless device 48 requests a remotely stored picture caller ID contact file 59, containing caller id contact information and/or image file. The network server 53 receives the SMS request for the picture caller ID contact file, and determines if a picture file exists for the requested contact file. Network server 53 may also apply security or distribution rules to determine if the requesting device is authorized to receive the picture file. If network server 53 needs further authorization, it may generate authorization request messages to the owner of the requested information, or to another trusted party. In another example, network server 53 may generate an authorization message to the requesting device, which requests further contact or security information prior to authorizing a picture download. In a specific example, network server 53 may require complete contact information, including a picture, from the requesting user prior to authorizing download.

After determining that a stored picture file exists and is authorized for download, network server 53 transports the requested picture caller ID contact data to the requesting device. As described above, the picture caller ID data files 59 are formatted as MMS messages for transport to the requesting device, but it will be understood that other message standards may be used. For example, an EMS system (Enhanced Message Service) or SMS (Multimedia Messaging Service) that has been enhanced to allow the use of voice or images may also be used. It will also be understood that messaging standards evolve and adapt as technology and user requirements change.

Referring again to FIGS. 2 and 3 the picture server and operations associated with picture server are described. In FIG. 2, picture server 55 comprises memory, and a processor 54 performing the operations of:
 1) managing caller ID data and picture caller ID user profiles;
 2) receiving requests for a picture associated with caller ID contact information;
 3) associating the requested caller ID with locally stored contact data;
 4) determining if a picture is locally stored for the contact being requested;
 5) communicating picture data status;
 6) receiving requests for picture download responsive to picture data status communication; and
 7) transporting requested picture data to requesting device.

Picture files 59, which are associated with user profiles 57, are stored in the picture server 55. User profiles 57 may be accessed and set from wireless device 46 or 48, or alternatively through web interface 69. As illustrated in FIG. 3, even in the case where picture server 87 lies outside the network infrastructure, access to user profiles 89 can be accomplished by contact between wireless device 73 or 75, or alternatively through web interface 93. Referring again to FIG. 2, it will be appreciated that the picture server 55 can exist either as part of the wireless network services 50 infrastructure as provided by network server 53, or as illustrated in FIG. 3, picture server 87 can exist independently of (i.e., outside) the network services infrastructure and is coupled to a telecommunications network. The coupling of independent picture server 87 to a telecommunications network can be made by wireless access, landline access or Internet access or any combination thereof. It will also be appreciated that server technology and equipment is continuously being improved and developed as user requirements and technology change. Therefore it will be appreciated that the present invention encompasses future server technology and equipment, as switching server equipment is a relatively easy operation.

Referring now to FIG. 2, picture server 55 stores picture caller ID contact files 59 and picture caller ID user profiles 57. Picture server 55 receives a request for a picture associated with caller id contact information from wireless device 46 or 48. Picture server 55, associates the requested caller id with locally stored contacts, by comparing the requested caller ID contact with data stored in the picture server 55 memory. It will be appreciated that there are numerous steps involved in the associative process. Some of these steps include but are not limited to, accessing stored picture caller ID information files 59, comparing the requested caller ID contact to the locally stored caller ID contact information files, and the like. After associating the requested caller ID contact with a locally stored picture caller ID contact file 59, picture server 55 then determines if a picture is locally stored for the contact. Again, it will be appreciated that there are numerous steps involved in the determination process. Some of these steps include but are not limited to, prior or simultaneous association of the requested caller ID contact with locally stored picture caller ID contact files 59, identification of image or image markers indicative of the presence of a locally stored picture for requested caller ID contact, and the like. Once picture server 55 has determined that a locally stored picture exists for requested caller ID contact, picture server 55 communicates picture data status, either the presence or absence of an associated picture file, to the requesting device. Along with the picture data status, a download authorization request is also transmitted. The picture data status and download authorization request are transmitted as SMS messages. It will be appreciated that other message formats can also be used, such as EMS or MMS. Upon receiving a download authorization message from the requesting device, picture server 55 initiates transport of the requested image to the requesting device. As described previously, the image files are sent in MMS message format. It will be appreciated that other message formats can also be used, such as EMS or newer extended forms of SMS that allow the inclusion of audio and image data.

It will also be appreciated that for independent picture server 87, as illustrated in FIG. 3, additional communication steps may be involved in the process described for FIG. 2, due to the remote arrangement of picture server 87. These additional steps It will also be appreciated that independent picture server 87 as illustrated in FIG. 3 and described herein, may also be configured to allow MMS and SMS server integration into the independent picture server 87 infrastructure. This would allow direct communication between picture server and requesting device once the requested caller ID contact was associated with locally stored contact data stored on independent picture server 87 and picture caller ID contact files 91. This would be akin to a hand-off of service, once a certain set of criteria were met.

Figure 4:
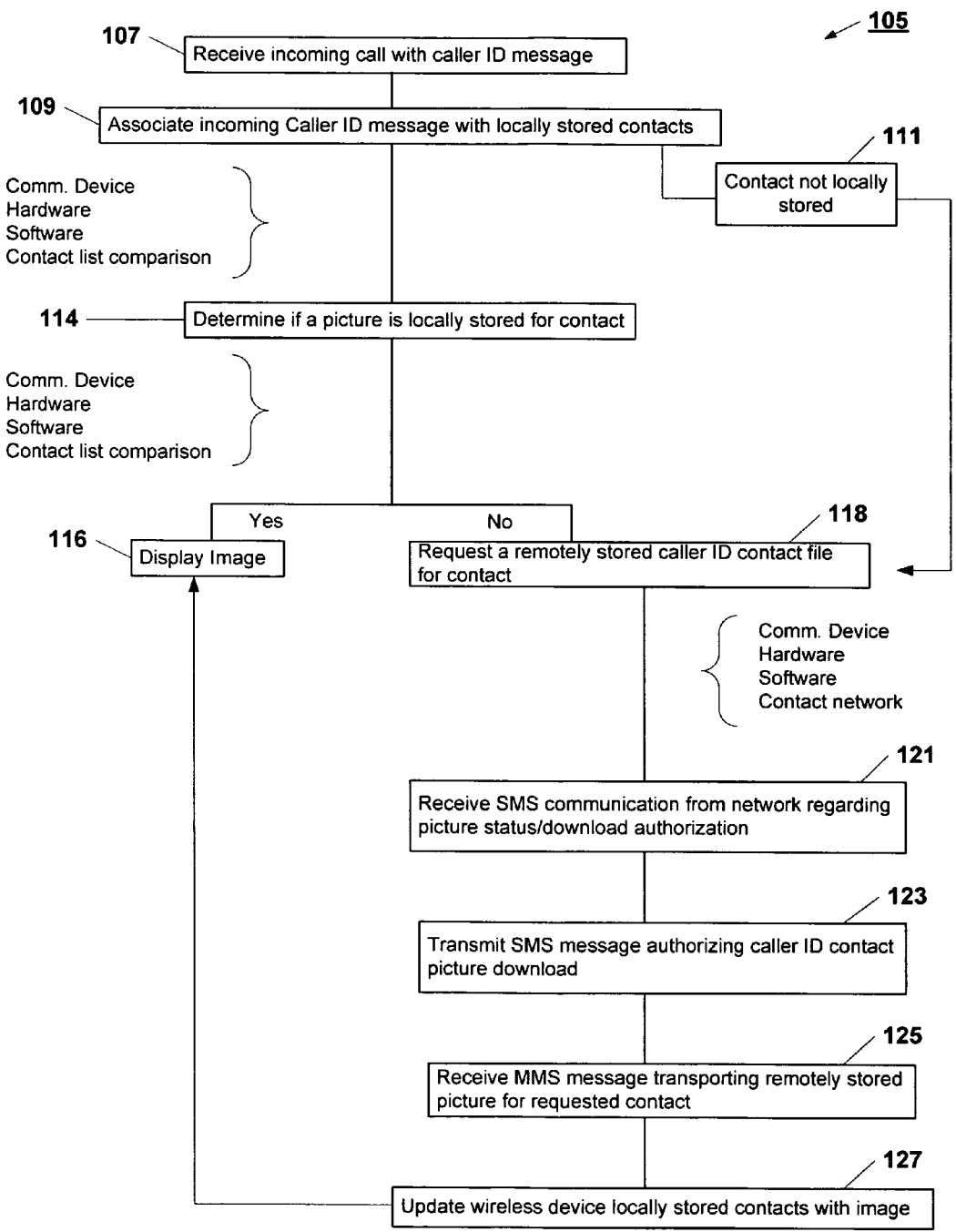
FIG. 4 is a flow chart of a method for retrieving automated picture caller id to a wireless communication device in accordance with the present invention.

Referring now to FIG. 4, process 105 for automated picture caller ID contact image retrieval is provided. In process 105, picture caller ID contact information will be transported to a wireless device. Process 105 is initiated when a wireless device receives an incoming call carrying caller ID message information as shown in block 107. Upon receiving caller ID message, the wireless device associates the caller ID contact information with the locally stored contact information as shown in block 109. If the wireless device finds locally stored contact information, the wireless device then determines if there is a locally stored picture associated with the locally stored contact information as shown in block 114. If there is a locally stored picture, then wireless device displays both the caller ID contact information and picture on wireless device display as shown in block 116. However, if the wireless device finds no locally stored contact information for the caller ID contact as shown in block 111, or if wireless device determines there is no locally stored image associated with locally stored contact 114, wireless device requests download of remotely stored caller ID contact image data and picture as shown in block 118.

When remotely stored picture caller ID contact information is located and ready for transport to wireless device, an SMS message is sent to wireless device indicating picture caller ID contact information status, and requesting transport authorization. The wireless device, upon receiving SMS message regarding contact status and transport authorization as shown in block 121, displays SMS message on wireless device display and then either awaits user input for transport authorization, or automatically sends transport authorization based on user defined rules stored in wireless device caller ID user profiles as shown in block 123. The wireless device, upon after sending the authorization, receives MMS message carrying caller ID contact information and/or caller id image as shown in block 125. Upon receiving the MMS message carrying the requested caller ID data or image files, the wireless device updates the locally stored contacts as shown in block 127, and the newly received information is ready for display either during the current call, or the next time a call carrying the same caller ID message is received 116.

Figure 5:
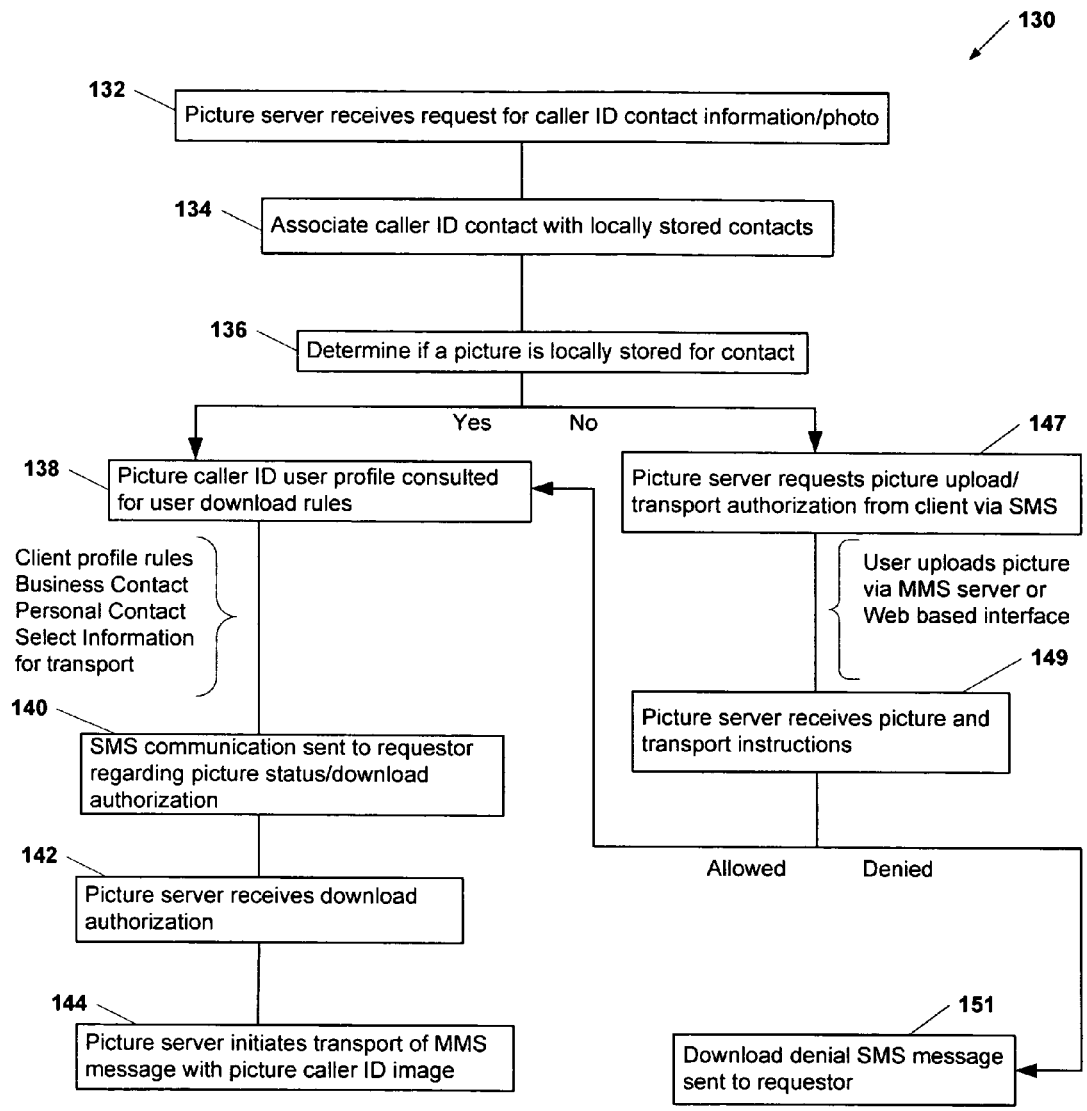
FIG. 5 is a flow chart of a method for providing automated picture caller ID information from a communication system in accordance with the present invention.

Referring now to FIG. 5, process 130 for providing automated caller id contact information and images from a picture server is provided. Process 130 is initiated when a request for caller ID contact information or photo data is received by picture server as shown in block 132. It will be appreciated that the picture server may be part of a carrier network infrastructure or a third party server that is connected to the carrier network. Upon receiving the request for caller ID contact information or photo from a wireless device, the picture server associates the caller ID message information with contacts stored at the picture server as shown in block 134. Once the appropriate caller ID contact information is found, the picture server then determines if there is a locally stored picture for the requested contact as shown in block 136. If a locally stored picture is found, the picture server then checks the caller ID user profile stored with the clients contact information to make a determination of what contact information or image should be transported to the requesting device as shown in block 138. Caller ID user profiles can be configured to allow all contact information, business contact information only, personal information only, or picture only to be transported, depending on the nature of the requestor. Once the caller ID user profile rule set is applied, picture server initiates transmittal of an SMS message communicating contact information or picture status, and requesting download authorization as shown in block 140. In some cases, no further authorization may be needed, so downloading could proceed immediately. Authorization can be used to allow a fee to be applied or to engage security measures to prevent unauthorized downloading. Authorization from wireless device, if needed, may either be fully automated according to caller ID user profile stored in wireless device, or may require additional input from the wireless device user. Upon receipt of return SMS authorizing download (see block 142), the picture server initiates transport of an MMS message carrying caller ID contact information or image data as shown in block 144.

In one example, if the picture server does not have a stored image for the contact, the picture server will initiate transmittal of an SMS message to the user associated with the caller ID message and request upload of predefined image control as shown in block 147. The upload process may be automatic according to predefined rules at the user device, or may require manual intervention by the user. The user may then upload an image or additional contact information using a responsive SMS or MSM transport. In another example, the user may use a web-based interface to upload a picture or additional contact information. The picture server receives the image data and transport instructions from user 149. Depending on the transport instructions received, the picture server may either check caller ID user profile to determine what information should be transported as requested in block 138, or send a denial of request message to the requesting wireless device as shown in block 151.

Figure 6:
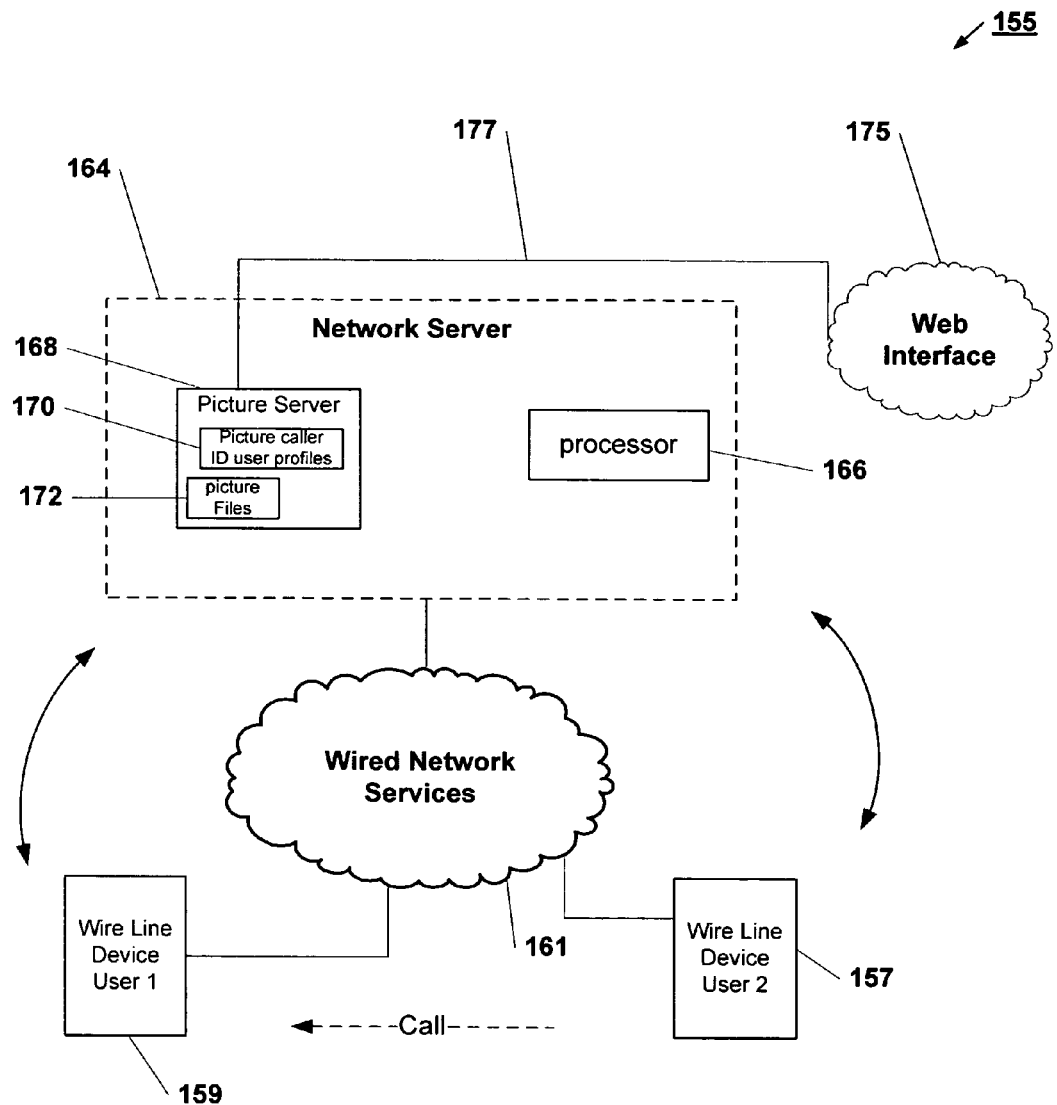
FIG. 6 is a block diagram of a communication system enabled for providing picture caller ID information in accordance with the present invention.

Referring now to FIG. 6, system 155 for providing picture caller ID services is illustrated. More particularly, network system 155 provides for automated picture caller ID file 172 transport to appropriately enabled devices 157/159. Devices 157 and 159 are enabled for automated picture caller ID contact information retrieval as further described with reference to FIG. 1. Network server 164, which may be part of network services 161, is configured to perform the operations of;
1) receiving a request from a wireless device for a picture associated with caller id information;
2) associating the requesting caller id with a contact stored in the network server;
3) determining if a picture is stored at the network server for the contact;
4) communicating picture data status;
5) receiving a request for picture download responsive to picture data status communication; and
6) transporting requested picture data to requesting wireless device.

Figure 7:
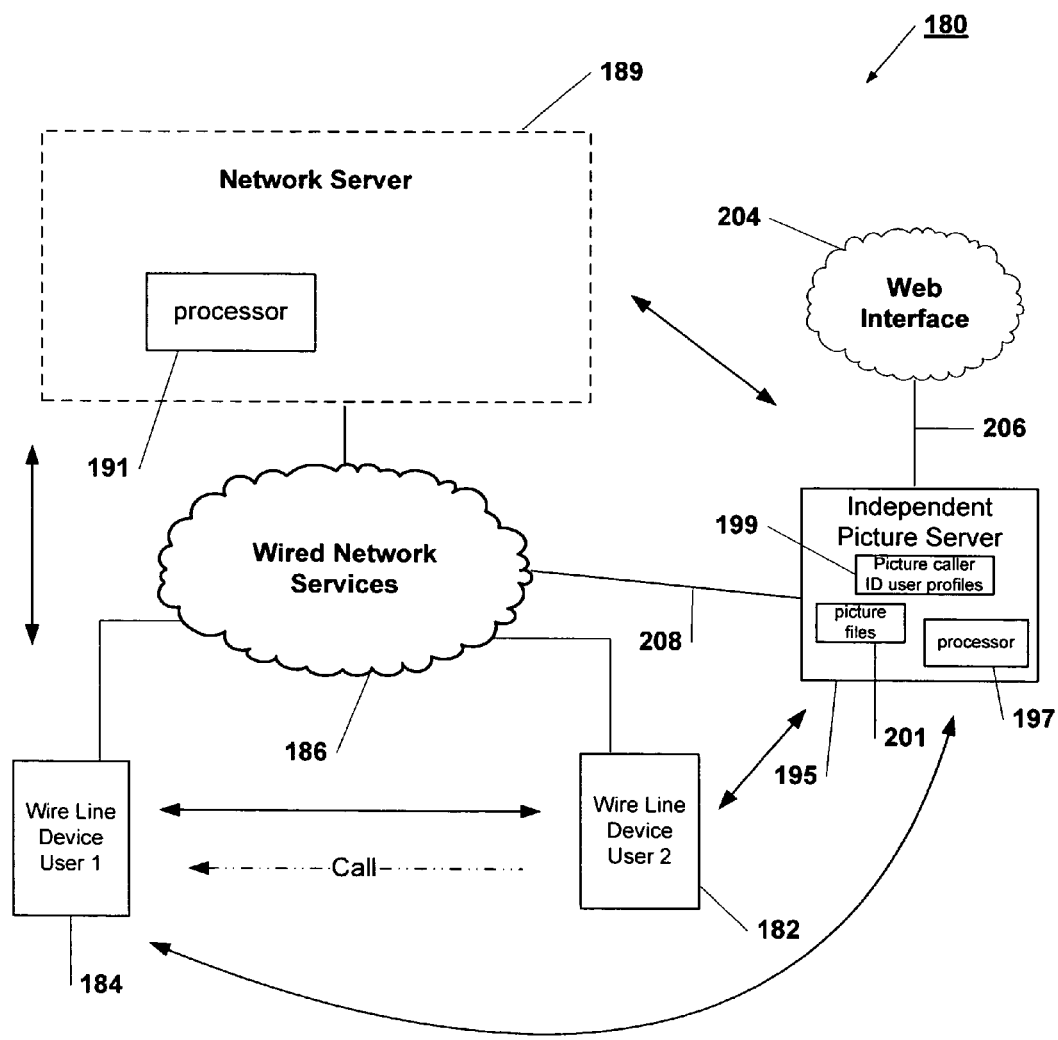
FIG. 7 is a block diagram of a communication system enabled for providing picture caller ID information in accordance with the present invention.

It will also be appreciated that picture server 168 may exist as part of the network services 161 infrastructure as illustrated by network server 164, or as illustrated in FIG. 7, picture server 195, can be external but connected to the carrier network.

Referring again to FIG. 6, picture server 168 contains images and contact information stored as picture caller ID contact files 172. Picture server 168 also contains picture caller ID user profiles 170. It will be understood that the present invention encompasses all available caller ID message information, including information carried as enhanced caller ID services. The present invention also encompasses any information entered in creation of picture caller ID contact file 59. Picture caller ID user profile 170 may contain rules used to control the automated distribution of information and images used in locally stored device picture caller ID contact files. Users may configure their picture caller ID user profiles 170 in a number of ways. One way is by a web interface 175 from a wireless device or through an internet connection to picture server 168. Another way to configure picture caller ID user profile 170 is using device 157/159 connected through network services to picture server 168.

As illustrated in FIG. 7, picture caller ID user profile 199 has rules used to control the automated distribution of information and images. Users can configure their picture caller ID user profiles 199 in a number of ways. Users may configure their picture caller ID user profiles 170 in a number of ways. One way is by a web interface 204 from a wireless device or through an internet connection to picture server 195. Another way to configure picture caller ID user profile 170 is using device 182/184 connected through network services to picture server 195.

Referring again to FIG. 6, user 2 (using device 157), places a call to user 1 (using device 159). The call is received at device 159 with caller ID information. Device 159 extracts the caller ID information, and compares it to contact information stored with device 159. If device 159 (user 1) determines that the incoming caller ID message is either not associated with locally stored contact information or that locally stored contact information has no picture associated with it, device 159 requests remotely stored picture caller ID contact file 172 from network server 164. Network server 164 associates the requested caller ID with picture caller ID contact information files 172 stored at picture server 168. Upon finding locally stored contact information responsive to the requested caller ID, network server 164 determines if a picture is stored locally in picture server 168 for the requested caller ID contact information. After making the determination about the presence or absence of locally stored picture contact information files 172, network server 164 communicates picture data status. If picture data is found stored locally in picture server 168, picture server also requests download authorization. Upon receiving download authorization, network server 164, in accordance with rules configured in caller ID user profile 170, transports the requested picture caller ID contact data to requesting device.

Picture server 168 performs the operations of;
1) managing caller ID data; and picture caller ID user profiles;
2) receiving requests for a picture associated with caller ID contact information;
3) associating the requested caller ID with locally stored contact data;
4) determining if a picture is locally stored for the contact being requested;
5) communicating picture data status;
6) receiving requests for picture download responsive to picture data status communication; and
7) transporting requested picture data to requesting device.

Picture server 168 has stored picture caller ID contact files 172, and picture caller ID user profiles 170. Picture server 168 receives an SMS request for a picture or enhanced contact data from device 157 or 159. The request typically is related to an incoming call received at the wireless device, and is used to enhance contact information stored locally at the wireless device. In this way, the request may have limited caller ID information (ie phone number), or may include some basic contact information such as the contact's name. Picture server 168 uses the received information to find more complete stored contact information, and may compare the requested caller ID contact with data stored in the picture server 168. It will be appreciated that the association may be accomplished in alternative ways. After associating the requested caller ID contact with a locally stored picture caller ID contact file 172, picture server 168 then determines if a picture is locally stored for the contact. Again, it will be appreciated that there are numerous alternative implementations for the determination process. Once picture server 168 has determined that a locally stored picture exists for requested caller ID contact, picture server 168 communicates picture data status, either the presence or absence of an associated picture file, to the requesting device. Along with the picture data status, a download authorization request is also transmitted. Upon receiving download authorization from requesting device, picture server 168 initiates transport of the requested image to the requesting device. It will be appreciated that for independent picture server 195, as illustrated in FIG. 7, additional steps will be involved in the process described for FIG. 6, due to the remote nature of picture server 195.

While particular preferred and alternative embodiments of the present intention have been disclosed, it will be apparent to one of ordinary skill in the art that many various modifications and extensions of the above described technology may be implemented using the teaching of this invention described herein. All such modifications and extensions are intended to be included within the true spirit and scope of the invention as discussed in the appended claims.

We claim:
1. A method performed on a picture server connected to a telecommunications network, comprising:
 storing a plurality of contact files, each contact file having an associated user profile configured by a picture owner and defining access control rules for the contact file;
 receiving, at the picture sever from a first wireless device, a request for a remote picture corresponding to a caller identifier (ID) identifying a second wireless device, the caller ID transmitted to the first wireless device from the second wireless device;

determining that the caller ID is not associated with any contact file of the plurality of contact files;

generating an information/picture request message;

sending the information/picture request to an address derived from the caller ID;

receiving an information/picture file;

storing an information portion of the information/picture file as the user profile of a contact file associated with the caller ID; and storing a picture portion of the information/picture file as a picture of the contact file associated with the caller ID;

verifying, using the user profile for the associated contact file, that the stored picture is authorized to be sent; and transporting the stored picture to the first wireless device.

2. The method according to claim 1, wherein the information/picture file is received from the telecommunications network.

3. The method according to claim 1, wherein the information/picture file is received from a network data connection.

4. A method comprising:

receiving, at a server from a wireless communication device, a request for a picture corresponding to caller identification (ID) of a calling communication device placing a call to the wireless communication device, the caller ID received at the wireless communication device from the calling device;

determining, at the server, that the caller ID is not associated with a plurality of contact files stored on the server;

generating, at the server, an information/picture request message;

sending the information/picture request from the server to an address derived from the caller ID;

receiving, at the server, an information/picture file;

storing, at the server, an information portion of the information/picture file as the caller ID user profile of a contact file for the received caller ID;

storing, at the server, a picture portion of the information/picture file as the picture of the contact file for the received caller ID; and sending, from the server to the wireless communication device, the picture in response to the request.

5. The method of claim 4, wherein the sending comprising:

sending the picture in accordance with rules defined by the caller ID user profile corresponding to the picture.

6. The method of claim 5, wherein the caller ID user profile is configured by a user of the calling communication device.

7. The method of claim 6, further comprising:

in response to determining that the caller ID is not associated with a contact file stored at the server, sending a Short Message System (SMS) message to the user requesting the picture.

8. A server for providing caller identification contact information, comprising:

a memory for storing a plurality of contact files;

a processor configured to receive a request for a picture corresponding to caller identification (ID) of a calling communication device placing a call to the wireless communication device, the caller ID received at the wireless communication device from the calling device;

generate an information/picture request message when the caller ID is not associated with a contact file of the plurality of contact files stored in the memory;

send the information/picture request to an address derived from the caller ID;

receive an information/picture file in response to the information/picture request;

store an information portion of the information/picture file as the caller ID user profile of a new contact file associated with the received caller ID;

store a picture portion of the information/picture file as the picture of the new contact file for the received caller ID; and send the picture in response to the request only when authorized by the caller ID user profile.

\* \* \* \* \*